United States Patent Office 3,312,668
Patented Apr. 4, 1967

3,312,668
POLYMERIC COMPOUNDS OF DIBENZYLIDENE-BENZENEDIACETONITRILES AND PROCESS OF PREPARING SAME
Myron James Holm, St. Louis, and Ferdinand B. Zienty, Warson Woods, Mo., assignors to Monsanto Company, a corporation of Delaware
No Drawing. Filed June 28, 1962, Ser. No. 205,831
11 Claims. (Cl. 260—78.4)

This invention relates to novel polymeric compounds and particularly to homopolymers of dibenzylideneben-zenediacetonitriles.

Dibenzylidenebenzenediacetonitriles are condensation products of benzaldehydes with benzenediacetonitriles. Several bifunctional compounds of this type are described and claimed in the copending application of Holm and Zienty, Ser. No. 170,833, filed Feb. 2, 1962, and have the following structural formula:

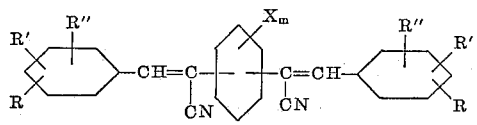

wherein
R is a monovalent substituent selected from the group consisting of hydroxy and hydroxyalkoxy, acyloxy, sulfonoxy, and epoxyalkoxy groups containing from 3 to 18 carbon atoms,
R' and R" are monovalent substitutents selected from the group consisting of hydrogen, hydroxy, hydroxyalkoxy, epoxyalkoxy, halogens, nitro, and alkoxy, aryloxy, acyloxy, sulfonoxy, acyl and alkyl groups containing from 1 to 18 carbon atoms, with all hydroxy groups being in the meta- or para-positions,
X is a monovalent substituent selected from the group consisting of halogens, nitro and methyl groups, and
m is an integer from 0 to 4, inclusive.

It has now been found that dibenzylidenebenzenediacetonitriles can be transformed into new and novel polymers. The novel products of the present invention can be prepared by the homopolymerization of the monomeric benzenediacetonitriles. This type of polymerization is induced and effected solely by the application of radiant energy to the monomeric compounds. More specifically, the present invention contemplates the synthesis of homopolymers by subjecting benzenediacetonitriles, while in the solid crystalline state, to radiant energy having a wave length less than about 6,000 Angstrom units, and preferably between about 3,000 and 6,000 Angstrom units. When compounds of this type, whether substituted or unsubstituted, are exposed to radiant energy having the requisite short wave length, they react with themselves to form insoluble, high melting, polymeric compounds. These products differ materially from the monomeric compounds, which are relatively soluble in a number of organic solvents and are generally colored.

The polymeric materials may be readily converted to the original monomeric form merely by the application of heat. Thus the methods and products of the present invention are well suited to a variety of photographic and heat printing processes. In addition, the polymeric products may be used as plasticizers or resin additives which can be incorporated in soluble monomeric form and then rendered insoluble by exposing them to light. Thus they can be employed to provide light stabilization or other light actuated beneficial effects to resinous materials. The marked difference in solubility between the monomeric and light-produced polymeric forms of these compounds renders them particularly adaptable for use in photoresist compositions. Also, because of the long conjugated electronic system present in the monomeric form but absent in the polymeric form, these compounds may be employed in applications involving electrical conductivity. This particular utility is based on the interconversion between conducting and insulating forms by means of heat and light. The insoluble polymeric forms may also be used to advantage in highly resistant coating formulations.

It has been found that a minimum temperature of about 260° C. is required to effect the depolymerization. In other words, the conversion of the homopolymers to monomeric compounds can be effected at temperatures between about 260° C. and the decomposition points of the homopolymer and its monomer.

The exact mechanism of the reaction involved is not known. However, it is believed that two ethylene groups in adjacent molecules of the benzenediacetonitriles combine to form a cyclobutane ring which then serves as the connecting link between two of the original molecules. Thus it is postulated that one ethylene group of each molecule reacts with an ethylene group of an adjacent molecule, and the other ethylene groups, in turn, react with another pair of adjacent molecules to form additional cyclobutane rings. The molecular structure of the resultant polymer is believed to be rather well represented by the following structural formulae:

(I)
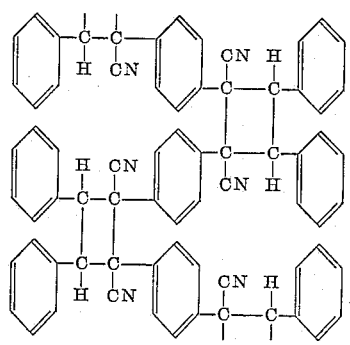

(II)
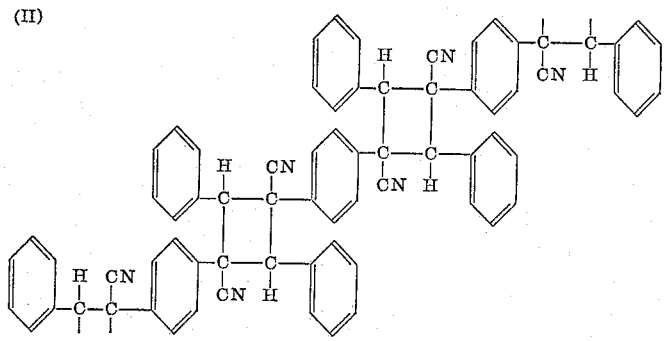

By reference to the above formulae, it will be noted that in I the nitrile groups are in the 1, 2 positions, whereas in II they are in the 1, 3 positions. Also, it will be noted that Formula I represents a "block" type of structure, whereas II represents a "staggered" type of structure. The actual position of the nitrile groups in the cyclobutane rings has not been positively determined, but it is well established that the products contain a large number of dicyano cyclobutane rings. The formulae shown in I and II, above, are somewhat diagrammatic, and the products can consist of either type of these structures or combinations or modifications of them. In any event, it is believed that the polymeric product is a complex three-dimensional molecule containing alternate benzene and cyclobutane rings. This assumption as to the particular arrangement of the polymeric molecule seems to be substituted by ultraviolet spectral and X-ray analyses. While the above formulae represent the present understanding of the construction of the polymeric materials obtained, it will be readily appreciated that the invention is not restricted to this supposition, but that it is directed to homopolymers of benzenediacetonitriles regardless of their particular stereo arrangement.

The polymeric products of the present invention have a molecular weight between about 3,000 and about 30,000. Thus they are formed by the polymeric combination of from 6 to about 60 units of the monomeric starting material. This molecular weight range has been confirmed by the intrinsic viscosity of the products. For example, the intrinsic viscosity of a sulfuric acid solution of the product produced by the action of incandescent light on alpha,alpha'-bis(4 - acetoxy - 3 - methoxybenzylidene)-p-benzenediacetonitrile was found to be 0.3. The approximate relationships between intrinsic viscosity and molecular weight are known for many polymers. By applying several of these relationships to the 0.3 intrinsic viscosity value, one obtains values in the 3,000 to 30,000 molecular weight range.

The radiant energy required to effect the polymerization of the present invention must have an average wave length less than 6,000 Angstrom units, and preferably has a wave length between about 3,000 and 6,000 Angstrom units. Thus, various types of light (either natural or artificial) can be employed. For example, strong sunlight or light from an incandescent bulb, with or without suitable filter, is completely satisfactory. Likewise, ultraviolet light, gamma rays, X-rays, and any other relatively short wave radiant energy can be readily utilized in accordance with the present invention. The light may be generated by various types of commercially available lamps, including ultraviolet lamps, fluorescent lamps, standard incandescent bulbs, and the like. The rate of reaction varies considerably with different crystalline structures, from one compound to another and also with the type and intensity of the radiant energy. In most instances, it is preferred to use incandescent light; but, in some cases, the reaction may be materially accelerated by the application of other types of light. Additionally, the starting compound can, in some particular cases, be advantageously exposed to two or more types of radiant energy. For example, one may concurrently expose the starting compound to X-rays and to the rays emitting from an incandescent bulb.

The present reaction may be conducted in a variety of ways. It is only necessary that the starting compound be in the solid crystalline state and exposed to a source of radiant energy. When relatively small amounts of a particular compound are required, or when it is desired to utilize batch operations, the compound being polymerized is placed in a tumbling vessel which is rotated while being exposed to the radiant energy. The tumbler can be any conventional type of apparatus, such as a Sweetie barrel, etc. Alternately, the starting compound can be placed in a suitable container which is transparent to the radiant energy employed. The container, such as a large cylindrical bottle, can then be closed, and any danger of contamination from the atmosphere is thus effectively eliminated.

The present process is also admirably well suited to continuous operation. The material to be treated is merely introduced into a conventional belt-type drier and passed into close approximation with a series of lamps providing the necessary short wave radiant energy. Since the reaction requires only light for its completion, there is no need to maintain close temperature control.

As pointed out above, the rate of reaction is primarily dependent upon the type and intensity of radiant energy. General speaking, the rate of reaction increases directly with the intensity of applied energy. Thus it is generally preferred to utilize high energy levels. These can be obtained by positioning the source of energy very close to the material being treated, or by the use of reflectors, concentrating lenses, and the like. The temperature has little, if any, effect upon the rate of reaction. It is only necessary that the starting material be maintained in a solid crystalline state. The particle size of the starting material likewise has no significant effect upon the rate of reaction. When relatively large particles of the starting material are employed, it has been noted that the product chips or spalls from the compound being processed. This action thus exposes additional starting material to the radiant energy. In most cases, however, it is preferred to utilize a starting material having a particle size between about 40 and 300 mesh.

The invention and the manner in which it accomplishes its objects will be more readily understood by reference to the following specific examples of preferred embodiments thereof. The proportions in these examples and throughout the specification are given in parts by weight unless otherwise indicated.

*Example 1*

A 5-gram sample of alpha,alpha'-bis(4-acetoxy-3-methoxybenzylidene) - p-benzenediacetonitrile elongated crystalline platelets is placed in an 8-ounce, clear glass, square bottle, capped, and slowly rotated at a distance of about three inches from a 200-watt incandescent light bulb. After approximately 18 hours, the sample turns from yellow to white. This resultant white material is insoluble in the following boiling solvents: water, hydrochloric acid, aqueous sodium hydroxide, acetone, ethanol, ethyl acetate, methyl cellosolve, dioxane, triethylamine, pyridine, chlorobenzene, trichloroacetic acid, 1,1,2-trichloroethane, phenylacetonitrile, dimethylformamide, dimethyl sulfoxide, naphthalene, diethyl carbitol, dibutyl carbitol, sulfolane, hexamethylphosphoramide, and a 20% solution of lithium chloride in dimethylformamide. It is also insoluble in camphor (at its melting point), in alpha,alpha'-dibenzylidene-p-benzenediacetonitrile (at its melting point), alpha,alpha'-di-(2 - thenylidene)-p-benzenediacetonitrile (at 310° C.), and alpha,alpha'-divanillylidene-p-benzenediacetonitrile (at 310° C.). It is soluble in concentrated sulfuric acid and dissolves slowly in alcoholic potassium hydroxide. The material melts at about 320° C. and gives the following analysis: Calculated for $(C_{30}H_{24}O_6H_2)_n$: C, 70.85; H, 4.76; N, 5.51. Found: C, 70.95, 71.00; H, 4.91, 4.73; N, 5.48, 5.60.

Infrared and ultraviolet spectra indicate the disappearance of the ethylenic double bonds present in the yellow material.

*Example 2*

A sample of the white product obtained in accordance with Example 1 is heated at about 78° C. for approximately 18 hours with a solution prepared from one gram of potassium hydroxide pellets and 50 ml. of ethyl alcohol. Then 40 ml. of water is added, the mixture warmed, then filtered. The liquors are acidified by the addition of hydrochloric acid, and the precipitate which formed is collected and dried. The precipitated material melts at 240–241° C., identifying it as alpha,alpha'-bis(4-acetoxy-3-methoxybenzylidene)-p-benzenediacetonitrile, the starting material of Example 1.

*Example 3*

Another sample of the white product from Example 1 is heated for about seven minutes at a temperature in the range of from 313° C. to 327° C. After cooling, the residue is dissolved in hot 1,1,2-trichloroethane. Upon cooling, crystals separate which are identified as alpha, alpha' - bis(4-acetoxy-3-methoxybenzylidene)-p-benzenediacetonitrile, the starting material used for the preparation of the homopolymer.

*Example 4*

A layer of the crystals of alpha,alpha'-bis(4-acetoxy-3-methoxybenzylidene)-p-benzenediacetonitrile approximately one millimeter in depth is exposed to the ultraviolet radiation from a General Electric H100–BL4 lamp. (This lamp radiates 99% of its energy in the 3,200–4,000 A. region.) A white solid is obtained which is identical to that obtained from the exposure with an incandescent lamp as described in Example 1.

The lamp is focused through a series of Pyrex lenses, and the intensity of the beam is measured by uranyl oxalate actinometry, using the method recommended by G. T. Rogers in Chemistry and Industry, page 572 (1956). Using this calibrated beam, samples of alpha,alpha'-bis-(4 - acetoxy - 3-methoxybenzylidene)-p-benzenediacetonitrile are exposed for varying periods of time, and the amount of material produced that was insoluble in 1,1,2-trichloroethane is measured. In this manner, the quantum yield is found to be about 0.7 double bond per photon.

*Example 5*

A layer of the crystals of alpha,alpha'-bis(4-acetoxy-3-methoxybenzylidene)-p-benzenediacetonitrile about one millimeter thick is exposed to sunlight for about six hours. Again the insoluble white material observed on irradiation with incandescent light is obtained.

*Example 6*

A substantial repetition of the processes of Examples 4 and 5, using emanations from a fluorescent lamp instead of ultraviolet light or sunlight, also yields the insoluble homopolymers of alpha,alpha' - bis(4 - acetoxy-3-methylbenzylidene)-p-benzenediacetonitrile.

*Example 7*

Crystals of alpha,alpha' - bis(4 - acetoxy - 3 - methoxybenzylidene)-p-benzenediacetonitrile are placed in the beam of X-rays, copper K-alpha radiation. The X-ray diffraction pattern obtained changes on exposure, indicating that the transformation to the homopolymer is produced by these X-rays.

*Example 8*

When a hot sodium of alpha-alpha'-bis(4-acetoxy-3-ethoxybenzylidene) - p - benzenediacetonitrile in acetic anhydride is allowed to cool, two different dimorphous crystal forms are obtained. One form consists of small crystals roughly the same size in the three dimensions; the other is in the form of large coarse needles several times as long as wide. The small crystals are readily converted to the polymeric form by exposing them to incandescent light, while the coarse needles are most conveniently converted by first warming them to a temperature between about 180° C. and about 240° C., followed by exposure of the heat-treated material to light.

*Example 9*

In a manner similar to that described in Example 2, the crystals of alpha-alpha'-bis(4-acetoxy-3-ethoxybenzylidene)-p-benzenediacetonitrile, having substantially the same size in three dimensions, are converted into a polymeric material by exposure to an ultraviolet source.

*Example 10*

When a layer of crystals of alpha-alpha'-bis(4-propionoxy-3 - methoxybenzylidene)-p-benzenediacetonitrile is exposed to illumination from fluoroescent lights, a polymeric product is obtained identical with that formed in Examples 1 and 4.

The corresponding homopolymers of other dibenzylidenebenzenediacetonitriles can be obtained in like manner by subjecting the monomeric materials to radiant energy of the requisite wave length. For example, ultraviolet light X-ray can be employed in the preparation of the homopolymers of:

alpha,alpha'-bis(4-acetoxy-3-ethoxybenzylidene)-p-benzenediacetonitrile,
alpha,alpha'-bis(4-butoxy-3-ethoxybenzylidene)-p-benzenediacetonitrile,
alpha,alpha'-bis(4-acetoxy-3-methoxybenzylidene)-m-benzenediacetonitrile,
alpha,alpha'-bis(4-acetoxy-3-methoxybenzylidene)-o-benzenediacetonitrile,
alpha,alpha'-bis(3-methoxy-4-stearoyloxybenzylidene)-p-benzenediacetonitrile,
alpha,alpha'-bis(4-hydroxy-3-methoxybenzylidene)-p-benzenediacetonitrile,
alpha,alpha'-bis(3-ethoxy-4-hydroxyethoxybenzylidene)-p-benzenediacetonitrile,
alpha,alpha'-bis[4-(2',3'-epoxypropoxy)-3-methoxybenzylidene]-p-benzenediacetonitrile,
alpha,alpha'-bis[4-(epoxystearoxy)-3-methoxybenzylidene]-p-benzenediacetonitrile,
alpha,alpha'-bis(3-acetoxy-4-hydroxyalkoxybenzylidene)-p-benzenediacetonitrile,
alpha,alpha'-bis[4-acetoxy-3-(2',3'-epoxyalkoxy)-benzylidene]-p-benzenediacetonitrile,
alpha-alpha'-bis(4-acetoxy-3-chlorobenzylidene)-p-benzenediacetonitrile,
alpha,alpha'-bis(4-acetoxy-3-nitrobenzylidene)-p-benzenediacetonitrile,
alpha,alpha'-bis(4-acetoxy-3-benzyloxybenzylidene)-p-benzenediacetonitrile,
alpha-alpha'-bis(4-benzoxy-3-methoxybenzylidene)-p-benzenediacetonitrile,
alpha,alpha'-bis(4-acetoxy-3-phenoxybenzylidene)-p-benzenediacetonitrile,
alpha-alpha'-bis(3-methoxy-4-sulfonoxybenzylidene)-p-benzenediacetonitrile,
alpha,alpha'-bis(4-acetoxy-3-methylbenzylidene)-p-benzenediacetonitrile,
alpha,alpha'-bis(4-acetoxy-3-butylbenzylidene)-p-benzenediacetonitrile,
alpha,alpha'-bis(4-acetoxy-3-allylbenzylidene)-p-benzenediacetonitrile,
alpha,alpha'-bis(4-acetoxy-3-octadecenylbenzylidene)-p-benzenediacetonitrile,
alpha,alpha'-bis(4-acetoxy-3-octadecylbenzylidene)-p-benzenediacetonitrile,
alpha,alpha'-bis(4-acetoxy-3-methylbenzylidene)-m-benzenediacetonitrile,
alpha,alpha'-bis(4-acetoxy-3-methylbenzylidene)-o-benzenediacetonitrile,
alpha,alpha'-bis(4-acetoxy-3-methylbenzylidene)-p-benzenediacetonitrile,
alpha,alpha'-bis(4-propionoxy-3-methylbenzylidene)-m-benzenediacetonitrile,
alpha,alpha'-bis(4-stearoyloxy-3-methylbenzylidene)-p-benzenediacetonitrile,
alpha,alpha'-bis(4-hydroxy-3-methylbenzylidene)-p-benzenediacetonitrile,
alpha,alpha'-bis(4-acetoxy-3-acetylbenzylidene)-p-benzenediacetonitrile,
alpha,alpha'-bis(4-acetoxy-3-stearoylbenzylidene)-p-benzenediacetonitrile,
alpha,alpha'-bis(4-acetoxy-3-methoxybenzylidene)-p-2'-methylbenzenediacetonitrile, alpha,alpha'-bis(4-acetoxy-3-methoxybenzylidene)-p-
2'-chlorobenzenediacetonitrile,
alpha,alpha'-bis(4-acetoxy-3-methoxybenzylidene)-p-
2'-nitrobenzenediacetonitrile,
alpha,alpha'-bis(4-acetoxy-3-methoxybenzylidene)-p-
2'-bromobenzenediacetonitrile,
alpha,alpha'-bis(4-acetoxy-3-methoxybenzylidene)-p-
2',5'-dimethylbenzenediacetonitrile,
alpha,alpha'-bis(4-acetoxy-3-methoxybenzylidene)-p-2',
5'-dichlorobenzenediacetonitrile,
alpha,alpha'-bis(4-acetoxy-3-methoxybenzylidene)-p-
2',5'-dinitrobenzenediacetonitrile,
alpha,alpha'-bis(4-acetoxy-3-methoxybenzylidene)-p-
2',5'-dibromobenzenediacetonitrile,
alpha,alpha'-bis(4-acetoxy-3-methoxybenzylidene)-p-
tetramethylbenzenediacetonitrile,
alpha,alpha'-bis(4-acetoxy-3-methoxybenzylidene)-m-
4'-methylbenzenediacetonitrile,
alpha,alpha'-bis(4-acetoxy-3-methoxybenzylidene)-m-
4'-chlorobenzenediacetonitrile,
alpha,alpha'-bis(4-acetoxy-3-methoxybenzylidene)-m-
4'-nitrobenzenediacetonitrile,
alpha,alpha'-bis(4-acetoxy-3-methoxybenzylidene)-m-
4'-bromobenzenediacetonitrile,
alpha,alpha'-bis(4-acetoxy-3-methoxybenzylidene)-m-
2',6'-dichlorobenzenediacetonitrile,
alpha,alpha'-bis(4-acetoxy-3-methoxybenzylidene)-p-
2'-chloro-5'-nitrobenzenediacetonitrile,
alpha,alpha'-bis(4-acetoxy-3-methoxybenzylidene)-o-
4'-chlorobenzenediacetonitrile, and
unsubstituted dibenzylidenebenzenediacetonitriles.

Numerous modifications and additional compounds will readily suggest themselves to those skilled in the art. Thus, while the invention has been described with particular reference to specific embodiments, it is to be understood that it is not limited thereto but is to be construed broadly and restricted solely by the scope of the appended claims.

The embodiments of the invention in which an exclusive property or privilege is claimed are defined as follows:

1. A homopolymer of a dibenzylidenebenzenediacetonitrile having a molecular weight of at least about 3,000.

2. A homopolymer of a dibenzylidene-p-benzenediacetonitrile having a molecular weight of at least about 3,000.

3. A homopolymer of alpha,alpha'-bis(4 - acetoxy - 3-methoxybenzylidene) - p - benzenediacetonitrile having a molecular weight of at least about 3,000.

4. A homopolymer of alpha,alpha'-bis(4-propionoxy-3-methoxybenzylidene)-p-benzenediacetonitrile having a molecular weight of at least about 3,000.

5. A homopolymer of alpha,alpha'-bis(4-butyroxy - 3-methoxybenzylidene) - p - benzenediacetonitrile having a molecular weight of at least about 3,000.

6. A homopolymer of alpha,alpha'-bis(4 - acetoxy - 3-ethoxybenzylidene)-p-benzenediacetonitrile having a molecular weight of at least about 3,000.

7. A homopolymer of alpha,alpha'-bis(4-propionoxy-3-ethoxybenzylidene) - p - benzenediacetonitrile having a molecular weight of at least about 3,000.

8. A process for the formation of a dibenzylidenebenzenediacetonitrile homopolymer which comprises subjecting the benzenediacetonitrile to radiant energy of a wave length shorter than about 6,000 Angstrom units.

9. A process for the formation of a dibenzylidenebenzenediacetonitrile homopolymer which comprises subjecting the benzenediacetonitrile to radiant energy having a wave length between about 3,000 and about 6,000 Angstrom units.

10. A process for the formation of a homopolymer of alpha,alpha'-bis(4 - acetoxy - 3 - methoxybenzylidene) - p-benzenediacetonitrile which comprises subjecting the benzenediacetonitrile to radiant energy of a wave length less than about 6,000 Angstrom units.

11. A process for the formation of a homopolymer of alpha,alpha' - bis(4 - acetoxy - 3 - methoxybenzylidene)-p-benzenediacetonitrile which comprises subjecting the benzenediacetonitrile to incandescent light.

References Cited by the Examiner

UNITED STATES PATENTS

| | | | |
|---|---|---|---|
| 2,448,755 | 9/1948 | Zellner | 260—78.4 |
| 2,971,977 | 2/1961 | Kolb | 260—78.4 |
| 3,097,227 | 7/1963 | Williams | 260—465 |

FOREIGN PATENTS 1,086,553   8/1960   Germany.

OTHER REFERENCES

Hoi et al.: "Rec. Trav. Chem.," vol. 74, pages 1119–24 (1955).

Waldmann et al.: "Ann.," vol. 527, pages 183–9, 1957.

Kauffman: Ber. der Deut. Chem., France, vol. 23, pp. 636–642.

JOSEPH L. SCHOFER, *Primary Examiner.*

DONALD E. CZAJA, L. WOLF, *Assistant Examiners.*